(12) United States Patent
Khansari Zadeh

(10) Patent No.: US 11,872,699 B2
(45) Date of Patent: Jan. 16, 2024

(54) GENERATING A ROBOT CONTROL POLICY FROM DEMONSTRATIONS COLLECTED VIA KINESTHETIC TEACHING OF A ROBOT

(71) Applicant: GOOGLE LLC, Mountain View, CA (US)

(72) Inventor: Seyed Mohammad Khansari Zadeh, San Carlos, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/097,153

(22) Filed: Jan. 13, 2023

(65) Prior Publication Data

US 2023/0150126 A1    May 18, 2023

Related U.S. Application Data

(63) Continuation of application No. 16/522,267, filed on Jul. 25, 2019, now Pat. No. 11,554,485, which is a
(Continued)

(51) Int. Cl.
*B25J 9/16* (2006.01)
*B25J 13/08* (2006.01)
(Continued)

(52) U.S. Cl.
CPC .............. *B25J 9/163* (2013.01); *B25J 13/088* (2013.01); *G05B 19/423* (2013.01);
(Continued)

(58) Field of Classification Search
CPC ........ B25J 9/163; B25J 9/1664; B25J 13/088; G05B 19/423; G05B 2219/40465;
(Continued)

(56) References Cited

U.S. PATENT DOCUMENTS 6,064,168 A   5/2000   Tao et al.
6,285,920 B1  9/2001   McGee et al.
(Continued)

FOREIGN PATENT DOCUMENTS

DE       19625637       1/1998

OTHER PUBLICATIONS

Khansari-Zadeh "Modeling robot discrete movements with state-varying stiffness and damping: A framework for integrated motion generation and impedance control" robotics proceedings (Year: 2014).*

(Continued)

*Primary Examiner* — Rachid Bendidi
(74) *Attorney, Agent, or Firm* — Gray Ice Higdon

(57) ABSTRACT

Generating a robot control policy that regulates both motion control and interaction with an environment and/or includes a learned potential function and/or dissipative field. Some implementations relate to resampling temporally distributed data points to generate spatially distributed data points, and generating the control policy using the spatially distributed data points. Some implementations additionally or alternatively relate to automatically determining a potential gradient for data points, and generating the control policy using the automatically determined potential gradient. Some implementations additionally or alternatively relate to determining and assigning a prior weight to each of the data points of multiple groups, and generating the control policy using the weights. Some implementations additionally or alternatively relate to defining and using non-uniform smoothness parameters at each data point, defining and using d parameters for stiffness and/or damping at each data point, and/or obviating the need to utilize virtual data points in generating the control policy.

10 Claims, 7 Drawing Sheets

Related U.S. Application Data continuation of application No. 16/230,478, filed on Dec. 21, 2018, now Pat. No. 10,391,632, which is a continuation of application No. 15/428,916, filed on Feb. 9, 2017, now Pat. No. 10,207,404.

(51) Int. Cl.
    *G05B 19/42* (2006.01)
    *G05B 19/423* (2006.01)
(52) U.S. Cl.
    CPC .............. *G05B 2219/40465* (2013.01); *G05B 2219/40471* (2013.01); *G05B 2219/40474* (2013.01); *Y10S 901/04* (2013.01)
(58) Field of Classification Search
    CPC ........... G05B 2219/40471; G05B 2219/40474; Y10S 901/04; G06N 20/00; G06V 20/10
    See application file for complete search history.

(56) References Cited

U.S. PATENT DOCUMENTS

| | | | |
|---|---|---|---|
| 8,121,731 B2 | 2/2012 | Ban et al. | |
| 8,386,069 B2 | 2/2013 | Hartmann et al. | |
| 8,412,379 B2 | 4/2013 | Gerio et al. | |
| 9,207,668 B2 | 12/2015 | Zhang et al. | |
| 9,221,174 B2 | 12/2015 | Negishi | |
| 9,242,376 B2 | 1/2016 | Iwasaki | |
| 9,393,687 B2 * | 7/2016 | Hietmann | B25J 9/0081 |
| 9,919,422 B1 | 3/2018 | Horton | |
| 9,925,662 B1 | 3/2018 | Jules | |
| 10,173,325 B2 * | 1/2019 | Motoyoshi | B25J 9/1697 |
| 10,207,404 B2 | 2/2019 | Khansari Zadeh | |
| 10,391,632 B2 | 8/2019 | Khansari Zadeh | |
| 2007/0030271 A1 | 2/2007 | Kamiya | |
| 2010/0305753 A1 | 12/2010 | Weiss et al. | |
| 2012/0239193 A1 | 9/2012 | Mizutani | |
| 2015/0217445 A1 | 8/2015 | Hietmann et al. | |
| 2016/0176046 A1 | 6/2016 | Zimmermann et al. | |
| 2016/0288332 A1 | 10/2016 | Motoyoshi et al. | |
| 2019/0344439 A1 | 11/2019 | Khansari Zadeh | |

OTHER PUBLICATIONS

European Patent Office; Intention to Grant issued in Application No. 20206274.1, 48 pages, dated Apr. 12, 2022.
European Patent Office; Communication issued in Application No. 20206274.1; 14 pages; dated Feb. 10, 2021.
European Patent Office; Intention to Grant for Application No. 18706162.7 dated May 29, 2020. 51 Pages. dated May 29, 2020.
Khansari-Zadeh, S. M., et al. "Imitation learning of globally stable non-linear point-to-point robot motions using nonlinear programming", Intelligent Robots and Systems (IROS), 2010 IEEE/RS International Conference on, IEEE, Piscataway, NJ, USA, Oct. 18, 2010 (Oct. 18, 2010), pp. 2676-2683, XP031920619, DOI: 10.1109/IROS.2010.5651259 ISBN: 978-1-4244-6674-0 Oct. 18, 2010.
European Patent Office; Invitation to Pay Additional Fees in International Patent Application No. PCT/US2018/017461; dated Jun. 22, 2018.
Winn, A. et al. "Learning Potential Functions by Demonstration for Path Planning," 2012 IEEE 51st Annual Conference on Decision and Control (CDC), pp. 4654-4659 Dec. 10, 2012.
European Patent Office; International Search Report and Written Opinion of PCT Ser. No. PCT/US2018/017461; 26 pages; dated Sep. 25, 2018.
Billard, Aude, et al. "Robot programming by demonstration." Springer handbook of robotics. Springer Berlin Heidelberg, 2008. 1371-1394.
Brock, O., Kuffner, J., & Xiao, J. (2008). Motion for manipulation tasks. In Springer Handbook of Robotics (pp. 615-645). Springer Berlin Heidelberg.

Buchli, J., Stulp, F., Theodorou, E., & Schaal, S. (2011). Learning variable impedance control. The International Journal of Robotics Research, 30(7), 820-833.
Calinon, S., D'halluin, F., Sauser, E. L., Caldwell, D. G., & Billard, A. G. (2010). Learning and reproduction of gestures by imitation. IEEE Robotics & Automation Magazine, 17(2), 44-54.
Calinon, S. et al. (Oct. 2010). "Learning-Based Control Strategy for Safe Human-Robot Interaction Exploiting Task and Robot Redundancies." In Intelligent Robots and Systems (IROS), IEEE/RSJ International Conference on (pp. 249-254).
Calinon, S., et al. (Sep. 2011). "Encoding the Time and Space Constraints of a Task in Explicit-Duration Hidden Markov Model." In Intelligent Robots and Systems (IROS), 2011 IEEE/RSJ International Conference on (pp. 3413-3418).
Cohen, M., & Flash, T. (1991). "Learning Impedance Parameters for Robot Control Using an Associative Search Network." IEEE Transactions on Robotics and Automation, 7(3), 382-390.
Ferraguti, F., et al. (May 2013). "A Tank-Based Approach to Impedance Control With Variable Stiffness." In Robotics and Automation (ICRA), 2013 IEEE International Conference on (pp. 4948-4953).
Ganesh, G., et al. (May 2012). "A Versatile Biomimetic Controller for Contact Tooling and Haptic Exploration." In Robotics and Automation (ICRA), 2012 IEEE International Conference on (pp. 3329-3334).
Gómez, J. V., et al. (Oct. 2012). "Kinesthetic Teaching via Fast Marching Square." In Intelligent Robots and Systems (IROS), 2012 IEEE/RSJ International Conference on (pp. 1305-1310).
Gribovskaya, E., et al. (2011). "Learning Non-Linear Multivariate Dynamics of Motion in Robotic Manipulators." The International Journal of Robotics Research, 30(1), 80-117.
Haddadin, S., et al. (Sep. 2008). "Collision Detection and Reaction: A Contribution to Safe Physical Human-Robot Interaction." In Intelligent Robots and Systems, 2008. IEEE/RSJ International Conference on (pp. 3356-3363).
Hogan, N. (1985). "Impedance control: An approach to manipulation: Part II—Implementation." Journal of Dynamic Systems, Measurement, and Control, 107(1), 8-16.
Hogan, N., & Buerger, S. P. (2005). "Impedance and Interaction Control, Robotics and Automation Handbook." 49 pages.
Howard, M., et al. (2013). "Transferring Human Impedance Behavior to Heterogeneous Variable Impedance Actuators." IEEE Transactions on Robotics, 29(4), 847-862.
Howard, M., et al.. (2010). "Methods for Learning Control Policies From Variable-Constraint Demonstrations." In From Motor Learning to Interaction Learning in Robots (pp. 253-291). Springer Berlin Heidelberg.
Ijspeert, A. J., et al. "Movement Imitation With Nonlinear Dynamical Systems in Humanoid Robots." In Robotics and Automation, 2002. Proceedings. ICRA'02. IEEE International Conference on (vol. 2, pp. 1398-1403).
Zadeh, S.M. Khansari. "A Dynamical System-Based Approach to Modeling Stable Robot Control Policies via Imitation Learning." PhD diss., École polytechnique fédérale de Lausanne, 2012. 253 pages.
Khansari-Zadeh, S. M., et al. (2011). "Learning Stable Nonlinear Dynamical Systems with Gaussian Mixture Models." IEEE Transactions on Robotics, 27(5), 943-957.
Khansari-Zadeh, S. M., et al, (2012). "A Dynamical System Approach to Realtime Obstacle Avoidance." Autonomous Robots, 32(4), 433-454.
Khansari-Zadeh, S. M., et al. (2014). "Learning Control Lyapunov Function to Ensure Stability of Dynamical System-Based Robot Reaching Motions." Robotics and Autonomous Systems, 62(6), 752-765.
Khansari-Zadeh, S. M., et al. (2014). "Modeling Robot Discrete Movements With State-Varying Stiffness and Damping: A Framework for Integrated Motion Generation and Impedance Control." Proceedings of Robotics: Science and Systems X (RSS 2014). 10 pages.
Khatib, O. (1986). "Real-Time Obstacle Avoidance for Manipulators and Mobile Robots." The International Journal of Robotics Research, 5(1), 90-98.

(56) References Cited

OTHER PUBLICATIONS

Khatib, O. (1987). "A Unified Approach for Motion and Force Control of Robot Manipulators: The Operational Space Formulation." IEEE Journal on Robotics and Automation, 3(1), 43-53.

Khatib, O. (1995). "Inertial Properties in Robotic Manipulation: An Object-Level Framework." The International Journal of Robotics Research, 14(1), 19-36.

O., et al. (2008). "A Unified Framework for Whole-Body Humanoid Robot Control With Multiple Constraints and Contacts." In European Robotics Symposium 2008 (pp. 303-312). Springer Berlin Heidelberg 2008.

Kim, B., et al. (2010). "Impedance Learning for Robotic Contact Tasks Using Natural Actor-Critic Algorithm." IEEE Transactions on Systems, Man, and Cybernetics, Part B (Cybernetics), 40(2), 433-443.

Kim, J. O., et al. (1992). "Real-Time Obstacle Avoidance Using Harmonic Potential Functions." IEEE Transactions on Robotics and Automation, 8(3), 338-349.

Kishi, Y., et al. (Oct. 2012). "The Role of Joint Stiffness Enhancing Collision Reaction Performance of Collaborative Robot Manipulators." In Intelligent Robots and Systems (IROS), 2012 IEEE/RSJ International Conference on (pp. 376-381).

Koditschek, D. E. (1989). "Robot Planning and Control via Potential Functions." The Robotics Review, 349-367.

Kormushev, P., (Oct. 2010). "Robot Motor Skill Coordination With EM-Based Reinforcement Learning." In Intelligent Robots and Systems (IROS), IEEE/RSJ International Conference on (pp. 3232-3237).

Kronander, K., et al. (2014). "Learning Compliant Manipulation Through Kinesthetic and Tactile Human-Robot Interaction." IEEE Transactions on Haptics, 7(3), 367-380.

Lee, K., et al. (2008). "Force Tracking Impedance Control With Variable Target Stiffness." IFAC Proceedings Volumes, 41(2), 6751-6756.

Li, M., et al. (May 2014). "Learning Object-Level Impedance Control for Robust Grasping and Dexterous Manipulation." In Robotics and Automation (ICRA), IEEE International Conference on (pp. 6784-6791).

Mattingley, J., et al. (2012). "Cvxgen: A Code Generator for Embedded Convex Optimization." Optimization and Engineering, 13(1), 1-27.

Mitrovic, D., et al. (2011). "Learning Impedance Control of Antagonistic Systems Based on Stochastic Optimization Principles." The International Journal of Robotics Research, 30(5), 556-573.

Mülling, K., (2013). "Learning to Select and Generalize Striking Movements in Robot Table Tennis." The International Journal of Robotics Research, 32(3), 263-279.

Pipe, A. G. (2000). "An architecture for learning 'potential field' cognitive maps with an application to mobile robotics." Adaptive Behavior, 8(2), 173-203.

Rimon, E., et al. (1992). "Exact Robot Navigation Using Artificial Potential Functions." IEEE Transactions on Robotics and Automation, 8(5), 501-518.

Schaal, S. (1999). "Is Imitation Learning the Route to Humanoid Robots?" Trends in Cognitive Sciences, 3(6), 233-242.

Slotine, J.J.E., et al. (1991). "Applied Nonlinear Control" (vol. 199, No. 1). Englewood Cliffs, NJ: Prentice-Hall. 476 pages.

Stulp, F., et al. (2012). "Model-Free Reinforcement Learning of Impedance Control in Stochastic Environments." IEEE Transactions on Autonomous Mental Development, 4(4), 330-341.

Ude, A., et al. (2010). "Task-Specific Generalization of Discrete and Periodic Dynamic Movement Primitives." IEEE Transactions on Robotics, 26(5), 800-815.

\* cited by examiner

GENERATING A ROBOT CONTROL POLICY FROM DEMONSTRATIONS COLLECTED VIA KINESTHETIC TEACHING OF A ROBOT

BACKGROUND

Various techniques have been proposed to enable robots to perform various tasks. For example, some techniques enable a user to kinesthetically teach the robot to follow a particular trajectory. For instance, the user may physically manipulate a robot arm to cause a reference point of an end effector of the robot arm to traverse the particular trajectory—and that particular traversed trajectory may thereafter be repeatable by the robot arm. However, those and other techniques may suffer from one or more drawbacks, such as those described herein.

SUMMARY

Some implementations of this specification are directed to methods and apparatus for generating a robot control policy based on data points that are based on robot sensor data generated during one or more physical manipulations of the robot by a user, such as a control policy that regulates both robot motion and robot interaction with the environment. A physical manipulation of a robot by a user is also referred to herein as a "kinesthetic teaching", and may involve the user physically interacting with a robot to cause a reference point of the robot to move along a trajectory from a starting point to a target point. As one particular example of a kinesthetic teaching, the user may cause a reference point of an end effector of the robot to move to a "target point" that is an electrical outlet (i.e., a kinesthetic teaching of placing a plug in the electrical outlet). This user-caused movement results in the robot traversing a multi-dimensional trajectory that can be described (e.g., by collected sensor data of the robot) in both robot work space and configuration space.

As used herein, the term "demonstration" refers to a group of data points for a corresponding kinesthetic teaching of a robot. As used herein, the term "data point" refers to data that describes a state of a robot at a corresponding time of the data point, and that also optionally describes additional parameters at the corresponding time. The state of the robot may be described in joint space (e.g., as the positions of each of the actuators of the robot) and/or task space (e.g., as the position and orientation of an end effector or other component of the robot). The state of the robot for a given data point can be based on sensor data from sensor(s) (e.g., joint position sensors) of the robot at a corresponding point in time (e.g., the state may strictly conform to the sensor data at the point in time). The additional parameter(s) that may also be described by a data point include, for example, stiffness and/or other parameter(s). The additional parameter(s) may be based on user input, other robot sensor data, etc. Moreover, as described herein, various further parameters may be assigned (i.e., stored in association with in one or more computer readable media) to each of a plurality of data points of a demonstration. For example, damping parameter(s), smoothness parameter(s), a prior weight, and/or a potential gradient may be assigned to a data point as described in detail herein. Additional description is provided herein of demonstrations and data points.

In some implementations, generating the control policy includes using the data points of one or more demonstrations in learning a non-parametric potential function for use in the control policy, where the learned non-parametric potential function has a global minimum that is based on a target point(s) (i.e., "end" data point(s)) of the demonstration(s) used in generating the control policy. In some of those implementations, the data points are further used in learning a dissipative field for use in the control policy. In some implementations, in learning the potential function and/or the dissipative field, constrained optimization problem(s) are solved using the data points as known parameters. The generated control policy enables a robot to move from any initial configuration to a desired target position: (1) from any of a plurality of "starting" states; (2) while adapting its motion in real-time to changing environmental conditions; and/or (3) while adapting stiffness and/or other parameters of the robot.

Implementations of this specification are related to various improvements in generating such a control policy that regulates both motion control and robot interaction with the environment and/or that includes a learned non-parametric potential function and/or dissipative field. In various implementations, the improvements improve performance of the control policy, improve learning of the potential function and/or dissipative field of the control policy, and/or achieve other benefits.

Some implementations relate to resampling temporally distributed data points of a demonstration to generate spatially distributed data points, and generating a control policy using the spatially distributed data points (e.g., in lieu of the temporally distributed data points). In some of those implementations, resampling the temporally distributed data points to generate spatially distributed data points includes interpolating one or more (e.g., all) of the spatially distributed data points. In other words, one or more of the spatially distributed data points are "inferred" data points that are inferred based on the temporally distributed data points. In some of the interpolation implementations, a spatially distributed data point is interpolated based on a total spatial length of the temporal data points (i.e., a total length along a trajectory that passes through each of the temporally distributed data points) and/or based on a spatial length that is particular to that spatially distributed data point (i.e., the spatial length from the beginning of the trajectory to a corresponding temporal data point).

Some implementations additionally or alternatively relate to automatically determining a potential gradient for one or more (e.g., all) data points, and generating a control policy using the automatically determined potential gradient. In some implementations, the potential gradient to assign to each of the data points of a demonstration is determined based on a total spatial length, a total time, and/or average damping of the demonstration.

Some implementations additionally or alternatively relate to determining and assigning a prior weight to each of the data points of one or more demonstrations. The prior weight of each data point is used to determine an energy contribution of the data point and that energy contribution used in generating the control policy (e.g., in learning the potential function for use in the control policy). The prior weight of a data point can be determined as a function of the spatial distances from that data point to other data points of one or more demonstrations being used in generating the control policy. If a given data point has a large quantity of other data points that are spatially close, the weight of the given data point will be less than it would if the given data point does not have any spatially close other data points Some implementations additionally or alternatively relate to defining non-uniform smoothness parameters for each data point, and using the non-uniform smoothness parameters of the data points in generating a control policy. In some implementations of defining non-uniform smoothness parameters, a frame is associated with each data point and, at each data point, smoothness is defined with d parameters (in contrast to a single parameter), where d is the task dimension.

Some implementations additionally or alternatively relate to using d parameters (where d is the task dimension) to define stiffness for each data point, using d parameters to define damping for each data point, and using the defined stiffness and damping for each of the data points in generating a control policy. For example, the stiffness and damping for a given data point can be defined with d parameters with respect to a frame associated with the given data point.

Some implementations additionally or alternatively relate to obviating the need to utilize virtual data points in generating a control policy by, for example, modifying one or more optimization constraints to ensure existence of a solution in generating the control policy.

In some implementations, a method implemented by one or more processors is provided that includes receiving a group of data points generated based on sensor data from one or more sensors of a robot during physical manipulation of the robot. The physical manipulation is by a user to traverse a reference point of the robot from an initial point to a target point. The data points of the group are uniformly distributed over time and each define a state of the robot at a corresponding time. The method further includes resampling the group of data points to generate a spatial group of spatially distributed data points that are spatially uniformly distributed; and generating a control policy that regulates both robot motion and robot interaction with an environment. Generating the control policy includes using the spatial group of spatially distributed data points in learning a non-parametric potential function for use in the control policy.

This method and other implementations of technology disclosed herein may each optionally include one or more of the following features.

In some implementations, the method further includes controlling a robot based on the control policy.

In some implementations, resampling the group of data points to generate the spatial group of spatially distributed data points includes: determining a total spatial length of the group of data points; and generating the plurality of the spatially distributed data points based on the total spatial length. In some of those implementations, generating a given spatially distributed data point, of the plurality of spatially distributed data points, based on the total spatial length includes: generating the given spatially distributed data point based on the total spatial length and based on a spatial length of a subgroup of the data points of the group.

In some implementations, the method further includes: determining a total spatial length of the group of data points; generating a potential gradient based on the total spatial length; and assigning the potential gradient to each of the spatially distributed data points of the spatial group. In some of those implementations, generating the control policy further includes using the potential gradient for the spatially distributed data points in learning the non-parametric potential function. In various implementations generating the potential gradient based on the total spatial length includes: calculating the potential gradient as a function of the total spatial length and a total time and/or an average damping along the trajectory.

In some implementations, the method further includes, for each of the spatially distributed data points of the spatial group, assigning non-uniform smoothness parameters to the spatially distributed data point. In some of those implementations, generating the control policy further includes using the non-uniform smoothness parameters for the spatially distributed data points in learning the non-parametric potential function.

In some implementations, the method further includes: defining a unique frame for each of the spatially distributed data points of the spatial group; and assigning a smoothness parameter to each of the unique frames for the spatially distributed data points. In some of those implementations, generating the control policy further includes using the smoothness parameters for the spatially distributed data points in learning the non-parametric potential function.

In some implementations, generating the control policy is independent of generating any virtual data points that mirror corresponding ones of the data points.

In some implementations, a method implemented by one or more processors is provided that includes determining a total spatial length of a group of data points. The group of data points are generated based on sensor data from one or more sensors of a robot during physical manipulation of the robot. The physical manipulation is by a user to traverse a reference point of the robot from an initial point to a target point. The method further includes generating a potential gradient based on the total spatial length, assigning the potential gradient to each of the data points of the group, and generating a control policy that regulates both robot motion and robot interaction with an environment. Generating the control policy includes using the data points with the assigned potential gradient in learning a potential function for use in the control policy.

This method and other implementations of technology disclosed herein may each optionally include one or more of the following features.

In some implementations, the method further includes controlling a robot based on the control policy.

In some implementations, the method further includes, for each of the data points of the group, assigning non-uniform smoothness parameters to the data point. In some of those implementations, generating the control policy further includes using the non-uniform smoothness parameters for the data points in learning the potential function.

In some implementations, generating the control policy is independent of generating any virtual data points that mirror corresponding ones of the data points.

In some implementations, generating the potential gradient based on the total spatial length includes: calculating the potential gradient as a function of the total spatial length, an average damping of the group, and a total time of the group.

In some implementations, a method implemented by one or more processors is provided that includes identifying data points, including at least a first group of data points generated based on robot sensor output during a first user-guided robot manipulation. The method further includes, for each of the data points: determining a plurality of spatial distances; and generating a prior weight for the data point based on the spatial distances. Each of the spatial distances are between the data point and a corresponding additional data point of the data points. The method further includes determining an energy contribution for each of the data points based on the data point and based on the prior weight for the data point. The method further includes generating a control policy that regulates both robot motion and robot interaction with an environment. Generating the control policy includes using the energy contributions for the data points in learning a potential function for use in the control policy.

This method and other implementations of technology disclosed herein may each optionally include one or more of the following features.

In some implementations, the method further includes controlling a robot based on the control policy.

In some implementations, the prior weight for a given data point of the data points is inversely proportional to proximity of the spatial distances for the given data point.

In some implementations, the method further includes, for each of the data points, assigning non-uniform smoothness parameters to the data point. In some of those implementations, determining the energy contribution for each of the data points is further based on the non-uniform smoothness parameters for the data point.

In some implementations, the method further includes: identifying a task parameter associated with the first user-guided robot manipulation; and determining the non-uniform smoothness parameters for the data points based on the task parameter.

In some implementations, generating the control policy is independent of generating any virtual data points that mirror corresponding ones of the data points.

In some implementations, the first group of data points and the second group of data points are each spatially uniformly distributed. In some of those implementations, the method further includes generating the first group of data points based on resampling an initial first group of data points that are uniformly distributed over time.

In some implementations, the data points further include: a second group of data points generated based on robot sensor output during a second user-guided robot manipulation.

Other implementations may include one or more non-transitory computer readable storage media storing instructions executable by a processor (e.g., a central processing unit (CPU) or graphics processing unit (GPU)) to perform a method such as one or more of the methods described above. Yet another implementation may include a system of one or more computers and/or one or more robots that include one or more processors operable to execute stored instructions to perform a method such as one or more (e.g., all) aspects of one or more of the methods described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
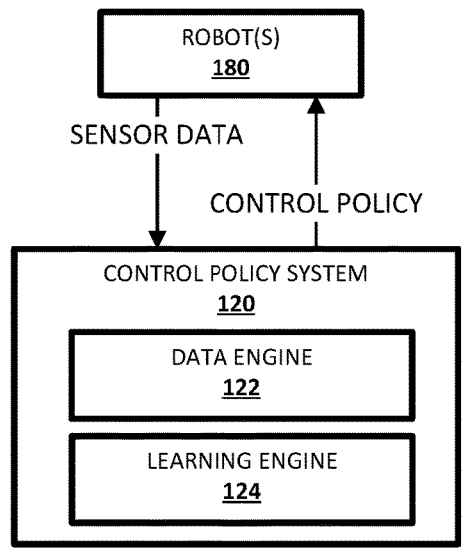
FIG. 1 illustrates an example environment in which a robot control policy may be generated according to various implementations disclosed herein.

Implementations of this specification are related to various improvements in generating a control policy that regulates both motion control and robot interaction with the environment and/or that includes a learned non-parametric potential function and/or dissipative field. In some implementations, the improvements improve performance of the control policy, improve learning of the potential function and/or dissipative field of the control policy, and/or achieve other benefits.

To enhance the readability of equations used herein, the following convention is utilized throughout the specification: typeface to refer to scalars (e.g. a), lowercase bold font for vectors (e.g. a), and uppercase bold font for matrices (e.g. A). Unless otherwise specified, the following notations are utilized with their unit specified in parenthesis:

Potential energy terms $\Phi$ and $\phi_0$ (Joule).

When referred to linear motions: state variable $\xi$ (m), stiffness S (N/m), damping D (N·s/m), force f(N), and dissipative field $\Psi(N)$.

When referred to angular motions: state variable $\xi$ (rad), stiffness S (N·m/rad), damping D (N·m·s/rad), torque f (N·m), and dissipative field $\Psi$ (N·m).

Spatial Resampling of Data Points

Some implementations described herein relate to resampling temporally distributed data points to generate spatially distributed data points, and generating a control policy using the spatially distributed data points.

Robot sensor data is typically sampled at a fixed sampling rate (e.g., 50 Hz, 100 Hz, or other rate). Accordingly, data points that are based on the robot sensor data are uniformly distributed over time. As described in detail herein, the data points can each include values that define a state of a robot at a corresponding time of the data point, and that also optionally describe additional parameters at the corresponding time. As described in detail herein, the state of a robot at a given point in time can be described in joint space and/or task space, and can be defined with values that strictly conform to the robot sensor data at the given point in time and/or that are derived from the robot sensor data at the given point in time. The spatial resampling of data points of a demonstration occurs before prior weights, smoothness parameters, etc. are assigned to the data points. Because the data points of a demonstration are uniformly distributed over time and are based on robot sensor data generated during human manipulation (kinesthetic teaching) of a robot—a greater quantity of data points will often be present in those segment(s) of a trajectory where the human "slowed down" while manipulating the robot. For example, a greater density of data points may be present near the beginning of a manipulation, an end of a manipulation, or other segment(s) of a manipulation where the human "slowed down" while manipulating the robot.

In generating a control policy based on the data points of a demonstration, such "overweighting" of data points in certain segment(s) of a demonstration may have unintended consequence(s). For example, in learning a potential function for use in the control policy, such overweighting can cause the learning to be badly-conditioned, leading to a potential function that is unduly biased toward the over-weight data points.

In view of these and/or other considerations, implementations disclosed herein resample the data points of a demonstration uniformly in space (in contrast to time). In other words, a temporally distributed group of data points is transformed to a spatially distributed group of data points. Further, in those implementations, the spatially distributed group of data points are then utilized in generating the control policy (in lieu of the temporally distributed data points). This may result in better-conditioned learning (as compared to temporally distributed data points) of a control policy (e.g., of a potential function of the control policy), which may improve performance of the control policy.

Figure 4:
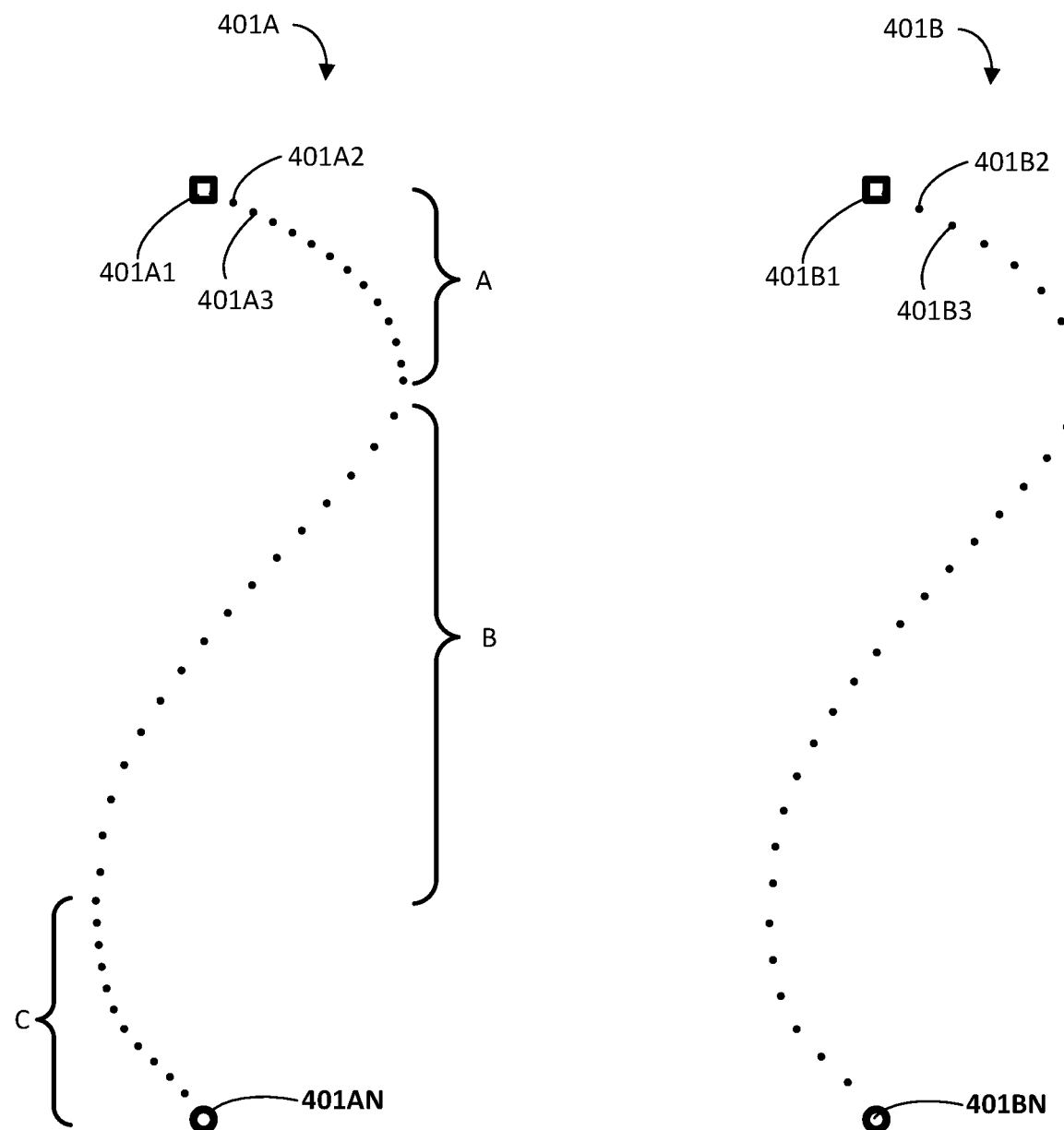
FIG. 4 illustrates a two-dimensional example of positional components of a temporally distributed group of data points and a spatially distributed group of data points.

Turning to FIG. 4, a two-dimensional example is illustrated of positional components of a temporally distributed group of data points 401A and a spatially distributed group of data points 401B. In the example of FIG. 4, distance between the data points is indicative of spatial distance. Although the example of FIG. 4 is a two-dimensional example of positional components of data points, it is understood that in practice the data points will often express position in a three-dimensional space (and may also express additional dimensions that define orientation and/or robot joint space).

The temporally distributed group of data points 401A include a starting data point 401A1 (illustrated as a square), additional data points 401A2, 401A3, etc., and a target/end data point 401AN (illustrated as a circle). The temporally distributed group of data points 401A are based on sensor data generated by sensors of a robot during a kinesthetic teaching where a user manipulates a robot reference point of the robot from a starting point (corresponding to data point 401A1) to a target point (corresponding to data point 401AN). As illustrated, the data points of segments A and C are spatially more densely distributed than those of segment B. This can be a result of the robot generating sensor data at a fixed sampling rate, and the user moving the robot more slowly at the beginning (segment A) and the end (segment C) of the manipulation during the kinesthetic teaching. Although FIG. 4 illustrates an example where the more densely populated segments are at the beginning and end of the manipulation, in many situations the more densely populated segments may appear in additional or alternative portions of the manipulation. For example, the user may additionally or alternatively move the robot more slowly at the middle of the manipulation during a kinesthetic teaching.

The spatially distributed group of data points 401B illustrate a spatial resampling of the temporally distributed group of data points 401A. The spatially distributed group of data points 401B include a starting data point 401B1 (illustrated as a square), additional data points 401B2, 401B3, etc., and a target/end data point 401BN (illustrated as a circle). As illustrated, the spatially distributed group of data points 401B are spatially uniformly distributed. For example, the spatial distance between data point 401B1 and data point 401B2 is the same as the spatial distance between data point 401B2 and 401B3, and so forth.

In some implementations, resampling the temporally distributed group of data points to generate spatially distributed data points includes interpolating one or more of the spatially distributed data points. In other words, one or more of the spatially distributed data points may be "inferred" data points that are inferred based on the temporally distributed data points. In some of those implementations, one or more spatially distributed data points are interpolated based on a total spatial length of the temporal data points (i.e., a total length along a trajectory that passes through each of the temporal data points) and/or based on a spatial length that is particular to that spatially distributed data point (i.e., the spatial length from the beginning of the trajectory to a corresponding temporal data point).

In some implementations, for a group of T+1 data points from a demonstration sampled uniformly in time at every $\delta t$ time interval, the following can be utilized to resample it uniformly along the trajectory (spatial sampling). In the following, the temporally distributed data points of each demonstration are represented by $(\xi^{t=0}, \xi^{t=\delta t}, \ldots, \xi^{t=K\delta t})$, where $\xi$ represents a state variable at the corresponding time.

First, the total spatial length of the trajectory, and the spatial length of the trajectory to any given data point (i) of the temporally distributed data points, can be determined based on:

$$\kappa^0 = 0$$

$$\kappa^i = \Sigma_{j=1}^{i} \|\xi^{t=j\delta t} - \xi^{t=(j-1)\delta t}\| \forall i \in 1 \ldots K$$

Accordingly, the total spatial length of the trajectory is given by $\kappa^K$. Moreover, the spatial length of the trajectory to any given data point (i) is given by $\kappa^i$.

Next, the T+1 data points can be resampled based on:

$$\varrho^i = i(\kappa^K/T) \forall i \in 0 \ldots T$$

Finally, the new spatially distributed data points $\{\xi^0, \xi^1, \ldots, \xi^T\}$ can be determined from the temporally distributed data points $\{\xi^{t=0}, \xi^{t=\delta t}, \ldots, \xi^{t=K\delta t}\}$ through interpolation of $\{\varrho^0, \varrho^1, \ldots, \varrho^T\}$ from $\{\kappa^0, \kappa^1 \ldots, \kappa^T\}$.

Automatically Determining a Potential Gradient

Some implementations described herein additionally or alternatively relate to automatically determining a potential gradient for one or more data points (e.g., a potential gradient for all data points of a demonstration), and generating a control policy using the automatically determined potential gradient. In some implementations, the potential gradient to assign to each of the data points of a group is determined based on total spatial length, a total time, and/or average damping of each demonstration.

Automatically determining a potential gradient obviates the need for tedious user input of a desired potential gradient and/or mitigates the risk of an erroneously inputted potential gradient, which may have a negative impact on control policy learning and/or performance. Automatically determining a potential gradient according to implementations disclosed herein may additionally or alternatively enable a robot to utilize a control policy generated on such a potential gradient to reach a target point in an amount of time that is generally (or strictly) consistent with the amount of time of the demonstration(s) on which the control policy is based.

In some implementations, the potential gradient to assign to each of the data points of a group is determined based on the total spatial length (see explanation of total spatial length above), a total time, and/or average damping of each demonstration. In some of those implementations, the potential gradient is determined as follows: Using the nomenclature of the explanation above, the total spatial length of the trajectory of a demonstration is denoted by $\kappa^K$ and the final time of that demonstration is denoted by $K\delta t$. The average damping along the trajectory can be determined, then a model that takes into account the damping utilized to model the robot motion along the trajectory. For example, the model can be: acceleration=gradient−(average damping*velocity). A Laplace transformation can then be utilized to model the robot motion as a function of time. The potential gradient (γ) can then be determined as follows, and can be used as the potential gradient for all of the data points of the group:

$$\gamma = \left((\kappa^K)(\bar{d}^2)/K\delta t \bar{d} - e^{-\bar{d}K\delta t}\right)$$

where $\bar{d}=(1/T+1)\Sigma_{i=0}^T d_1^i$. The variable $d_1^i$ denotes damping parameters and is described in more detail below.

Prior Weight for Each Data Point

In some implementations of generating a control policy, multiple groups of data points may be utilized, with each group being a unique demonstration from a corresponding kinesthetic teaching. While it is expected that multiple demonstrations from multiple kinesthetic teachings should improve the control policy, this may not always be the case with certain prior techniques. This can be due to the over-population of data points in certain regions (e.g., close to the target point). Such over-population can cause the control policy to attract robot motion toward the target point more quickly than desired, causing it to deviate from the motion(s) of the demonstrated trajectories.

Figure 5A:
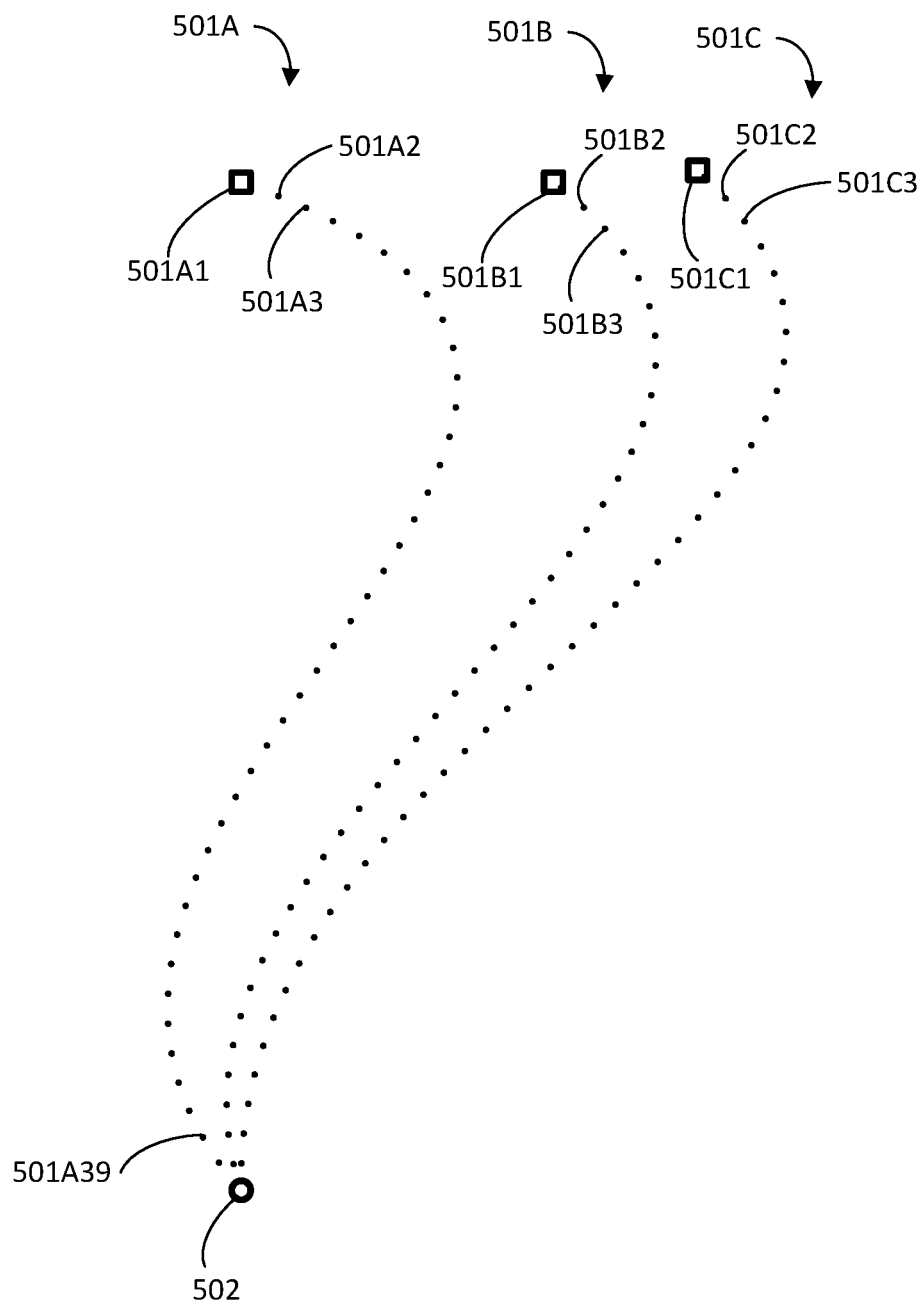
FIG. 5A illustrates a two-dimensional example of positional components of three separate groups of data points.

Turning to FIG. 5A, a two-dimensional example is illustrated of positional components of three separate groups of data points 501A, 501B, and 501C. The three separate groups of data points 501A, 501B, and 501C are each a corresponding demonstration from a corresponding one of three different kinesthetic teachings.

Group of data points 501A includes a starting data point 501A1 (illustrated as a square), additional data points 501A2, 501A3, etc., and a target/end data point (which is illustrated as a circle 502 and is illustrated as overlapping with the target/end points of the other two groups). Group of data points 501B includes a starting data point 501B1 (illustrated as a square), additional data points 501B2, 501B3, etc., and a target/end data point 502 (which is illustrated as a circle and is illustrated as overlapping with the target/end points of the other two groups). Group of data points 501C includes a starting data point 501C1 (illustrated as a square), additional data points 501C2, 501C3, etc., and a target/end data point (which is illustrated as a circle 502 and is illustrated as overlapping with the target/end points of the other two groups). Although the example of FIG. 5A is a two-dimensional example of positional components of data points, it is understood that in practice the data points will often express position in a three-dimensional space (and may also express additional dimensions that define orientation). Also, although the example of FIG. 5A shows the target/end data point of each of the groups 501, 501B, and 501C being the same, it is understood that in practice the end data points will often vary from one another (e.g., vary by a few millimeters).

As appreciated from viewing FIG. 5A, the density of data points closer to the circle 502 is much greater than is the density of the data points closer to the starting points. For example, there is a greater density of data points near data point 501A39 than there is near data point 501A2. Again, such a greater density of data points causes the generating of the control policy (e.g., learning the potential function) to be unduly biased toward the greater density data points.

In view of these and/or other considerations, implementations disclosed herein assign a prior weight to each of the data points. The prior weight of a data point may be a function of the spatial distances from that data point to other data points (e.g., to each of the other data points of all three groups 501A, 501B, 501C). If a given data point has a large quantity of additional data points that are spatially close, the prior weight of the given data point will be less than it would if the given data point did not have any spatially close additional data points. For example, in FIG. 5A, data point 501A39 will be weighted less heavily than data point 501A3. The prior weight of each data point can be used to determine an energy contribution of the data point and that energy contribution used in learning a potential function for use in the control policy.

In some implementation, the prior weight ($\pi^i$) of each of the data points (i) of T data points from one or more groups/demonstrations may be determined based on the following:

for i=1:T

δ=0 for k=1:T $\delta=\delta+e^{-0.5(\xi^i-\xi^k)^T(\xi^k)^{-1}(\xi^i-\xi^k)}$ $\pi^i$(the prior weight of i)=1/δ.

As mentioned above, the prior weight ($\pi^i$) of each of the data points (i) can be used to determine an energy contribution of each data point. For example, the prior weight can be used in the following equation that determines the contribution of each data point at a query point $\xi \in \mathbb{R}^d$:

$$\omega^i(\xi)=\pi^i e^{-0.5(\xi-\xi^i)^T(\Sigma^i)^{-1}(\xi-\xi^i)}$$

Additional description is provided below of use of the immediately preceding equation in generating a control policy.

FIG. 5A is described as an example of generating prior weights for data points of three separate demonstrations/groups. However, in some implementations, prior weights may be determined for data points of a single demonstration. For example, FIG. 5B illustrates a group of data points 501D that includes a starting data point 501D1 (illustrated as a square), additional data points 501D2, 501D3, etc., and a target/end data point 501DN (which is illustrated as a circle).

Figure 5B:
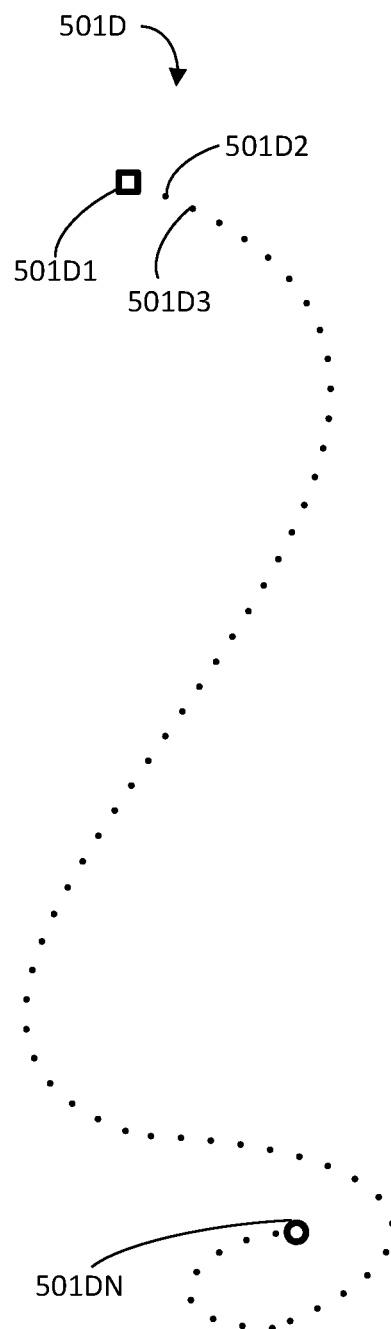
FIG. 5B illustrates a two-dimensional example of positional components of a demonstration.

As appreciated from viewing FIG. 5B, the density of data points closer to the circle 501DN is greater than is the density of the data points closer to the starting point 501D1. Again, such a greater density of data points causes the generating of the control policy (e.g., learning the potential function) to be unduly biased toward the greater density data points. If a given data point has a large quantity of additional data points that are spatially close, the prior weight of the given data point will be less than it would if the given data point did not have any spatially close additional data points. For example, in FIG. 5B, a prior weight can be generated for data point 501DN and a prior weight can also be generated for data point 501D2. The generated prior weight for data point 501DN will be a "lesser weight" than that of data point 501D2.

Non-Uniform Smoothness Parameters

In some implementations, smoothness parameters are utilized to control the region of influence of each data point in generating a control policy. The region of influence of a data point is the spatial region that it influences. In certain prior techniques, the smoothness parameter is scalar at each data point. In other words, it has a uniform influence in all directions. However, this provides less flexibility in developing a control policy. For example, for some control policies it may be desirable for data points to have greater influence in some directions than in other directions. For instance, it may be desirable for a control policy for a task where it is important for the reference point to bias toward maintaining position in one or more particular axes (e.g., a "Z axis" when a table or other surface is to be contacted).

Accordingly, some implementations described herein define non-uniform smoothness parameters for each data point, and use the non-uniform smoothness parameters in generating a control policy. In some implementations, a frame is associated with each data point and, at each data point, smoothness is defined with d parameters, where d is the task dimension.

In some implementations, for a task specified in $\mathbb{R}^d$, where d is the task dimension, a frame $U^i \in \mathbb{R}^{d \times d}$ is associated to each data point i as follows:

$U^i = [u_1^i u_2^i \ldots u_d^i]$, where $u_j^i \in \mathbb{R}^d \forall j = 1 \ldots d$ where $u_1^i$ is chosen to be a unit vector along the direction of the motion (i.e., the demonstration velocity, $\dot{\xi}^i$), and the remaining unit vectors $u_2^i$ to $u_d^i$ are randomly selected, provided by a user (e.g., through a user interface input device of a robot and/or computing device), or determined based on a task parameter—with the constraint that $U^i$ forms an orthonormal basis. At each data point local frame, smoothness is then defined with d parameters (in contrast to a single parameter):

$\Sigma_L^i = [(\sigma_1^i)^2 (\sigma_2^i)^2 \ldots (\sigma_d^i)^2]I$, where $I \in \mathbb{R}^{d \times d}$ is a d-dimensional identity matrix.

With the above definition of $U^i$ and $\Sigma_L^i$, the smoothness matrix in the task frame can be described as follows:

$\Sigma^i = U^i \Sigma_L^i (U^i)^T$, where T stands for matrix transpose.

This definition for smoothness increases the number of parameters for smoothness from to Td. This affects various aspects of the generation of a control policy that take into account smoothness of data points, such as those set forth more fully below.

In some implementations where the remaining unit vectors of a frame are determined based on a task parameter, the task parameter may be identified based on user input (e.g., through a user interface input device), and may be selected to bias toward maintaining more conformance in one or more dimensions that are associated with the task parameter. The task parameter may, for example, particularly identify the task (e.g., cleaning a table), identify a class of tasks, and/or identify a biasing for the task (e.g., bias toward the ground). In some implementations where the remaining unit vectors are determined based on a task parameter, the task parameter may additionally or alternatively be inferred from demonstration(s) themselves, other sensor data (e.g., based on objects detected from camera sensor(s)), etc.

Reducing Number of Parameters for Stiffness and Damping

In some implementations, stiffness and/or damping of each data point are also utilized in generating a control policy. In certain prior techniques, the stiffness and damping at each data point are symmetric positive definite d-dimensional matrices. This means that according to those certain prior techniques, d(d+1)/2 parameters are needed to define stiffness at each data point and the same number of parameters are needed to define damping at each data point.

However providing these stiffness and damping parameters can be laborious and/or computationally expensive. Using the definition of frame in the above section, the number of parameters for stiffness and damping for a data point can be reduced from d(d+1)/2 to d without significant performance degradation.

For example, at each data point's local frame ($U^i$), stiffness can be defined with d parameters, where:

$S_L^i = [s_1^i s_2^i \ldots s_d^i]I$, where $I \in \mathbb{R}^{d \times d}$ is a d-dimensional identity matrix.

With the above definition of $U^i$ and $S_L^i$, the stiffness matrix in the global frame can be described as follows:

$S^i = U^i S_L^i (U^i)^T$

Similarly, the damping matrix can be described as:

$D_L^i = [d_1^i d_2^i \ldots d_d^i]I$(at each data point's local frame); and $D^i = U^i D_L^i (U^i)^T$(the damping matrix in the global frame).

Removing Dependency on Generating Virtual Data Points

In certain prior techniques, so called "virtual data points" are generated from demonstration data points in order to ensure existence of a solution in learning a potential function. However, in some situations, virtual data points may interfere with data points from actual demonstrations. For example, virtual data points are generated by mirroring demonstration data points around the origin. If there are two demonstrations that approach a target point from opposite directions, their mirror around the origin (i.e., their virtual data points) could interfere with each other.

In view of these and/or other considerations, implementations disclosed herein obviate the need to have virtual data points by, for example, modifying one or more optimization constraints of certain prior techniques to ensure existence of a solution. Additional detail on the modified optimization constraint(s) are provided herein.

Example Environment

Turning now to FIG. 1, an example environment is illustrated in which a robot control policy may be generated according to various implementations described herein. The example environment includes one or more robots 180 and a control policy system 120. Although the control policy system 120 is illustrated as separate from the robot(s) 180, in some implementations one or more aspects of the control policy system 120 may be implemented by a corresponding one of the one or more robots 180 (e.g., by one or more processors of the robot). For example, in some implementations each of the robot(s) 180 may include an instance of the control policy system 120. In some implementations, one or more (e.g., all) aspects of the control policy system 120 are implemented on a computing device that is separate from the robot(s) 180, such as one or remote computing devices in network communication with the robot(s) 180. For example, one or more aspects of the control policy system 120 may be implemented by remote computing device(s), the robot(s) 180 may transmit (via one or more networks) data from demonstration(s) to the remote computing devices, the remote computing device(s) may generate the control policy based on the transmitted data, then transmit the generated control policy back to the robot(s) 180.

During a kinesthetic teaching/physical manipulation by a user of one of the robot(s) 180, sensor data is generated by the robot. The sensor data is provided to the control policy system 120. The control policy system 120 generates a group of data points based on the sensor data of the kinesthetic teaching and uses the group of data points in generating a control policy. The control policy is provided for use by one or more of the robot(s) 180 (the same robot of the kinesthetic teaching and/or additional robot(s)). Such robot(s) 180 use the control policy to selectively control one or more of its actuators based on the control policy. For example, the control policy may be invoked by such robot(s) 180 in response to detection of an object associated with the control policy, a task associated with the control policy, etc. —and used by the robot in regulating both motion and interaction with the environment. As described herein, in some implementations, sensor data from multiple kinesthetic teachings are provided to the control policy system 120 and utilized by the system 120 in generating a single control policy. The sensor data from each of the kinesthetic teachings may be utilized to generate a corresponding demonstration/group of data points. Sensor data from multiple kinesthetic teachings may all be provided by the same robot and/or by different robots.

The control policy system 120 includes a data engine 122 and a learning engine 124. In some implementations, more or fewer engines may be provided. In some implementations, the data engine 122 resamples a temporally distributed group of data points to generate a spatially distributed group of data points, and provides the spatially distributed group of data points to learning engine 124 for use in generating a control policy. In some implementations, the data engine 122 additionally or alternatively automatically generates a potential gradient for a group of data points, assigns the potential gradient to the data points of the group, and provides the assigned potential gradient to learning engine 124 for use in generating a control policy.

The learning engine 124 generates a control policy using one or more groups of data points that are each based on robot sensor data from a corresponding kinesthetic teaching. In some implementations, in generating the control policy, the learning engine 124 utilizes the group(s) of data points in learning a non-parametric potential function for use in the control policy, where the non-parametric potential function has a global minimum that is based on target point(s) of the group(s) of data points. In some of those implementations, the learning engine 124 further utilizes the group(s) of data points in learning a dissipative field for use in the control policy. In some implementations, the learning engine 124 solves constrained optimization problem(s) in learning the potential function and/or the dissipative field. While the global minimum of a learned potential function will be based on target point(s) of the groups(s) of data points, it is understood that in many situations it will not strictly conform to the target point(s). Moreover, where multiple target point(s) of multiple group(s) are provided, it is understood that those target point(s) may not all strictly conform to one another.

In implementations where the data engine 122 provides spatially distributed group(s) of data points and/or automatically generated potential gradient(s), the learning engine 124 generates the control policy based on such provided data. In some implementations, the learning engine 124 additionally or alternatively determines a prior weight for each of the data points of provided group(s) of data points, and uses the prior weights in generating the control policy. In some implementations, the learning engine 124 additionally or alternatively defines non-uniform smoothness parameters for each of the data points of provided group(s) of data points, and uses the non-uniform smoothness parameters in generating the control policy. The non-uniform smoothness parameters may be defined based on input provided by a user (e.g., provided via a user interface input device). In some implementations, the learning engine 124 additionally or alternatively defines stiffness and/or damping with d parameters for each of the data points of provided group(s) of data points (where d is the task dimension), and uses such defined parameters in generating the control policy. In some implementations, the learning engine 124 additionally or alternatively generates the control policy independent of generating any virtual data points that mirror corresponding ones of the data points of provided group(s) of data points.

Example of a Kinesthetic Teaching

Figure 2:
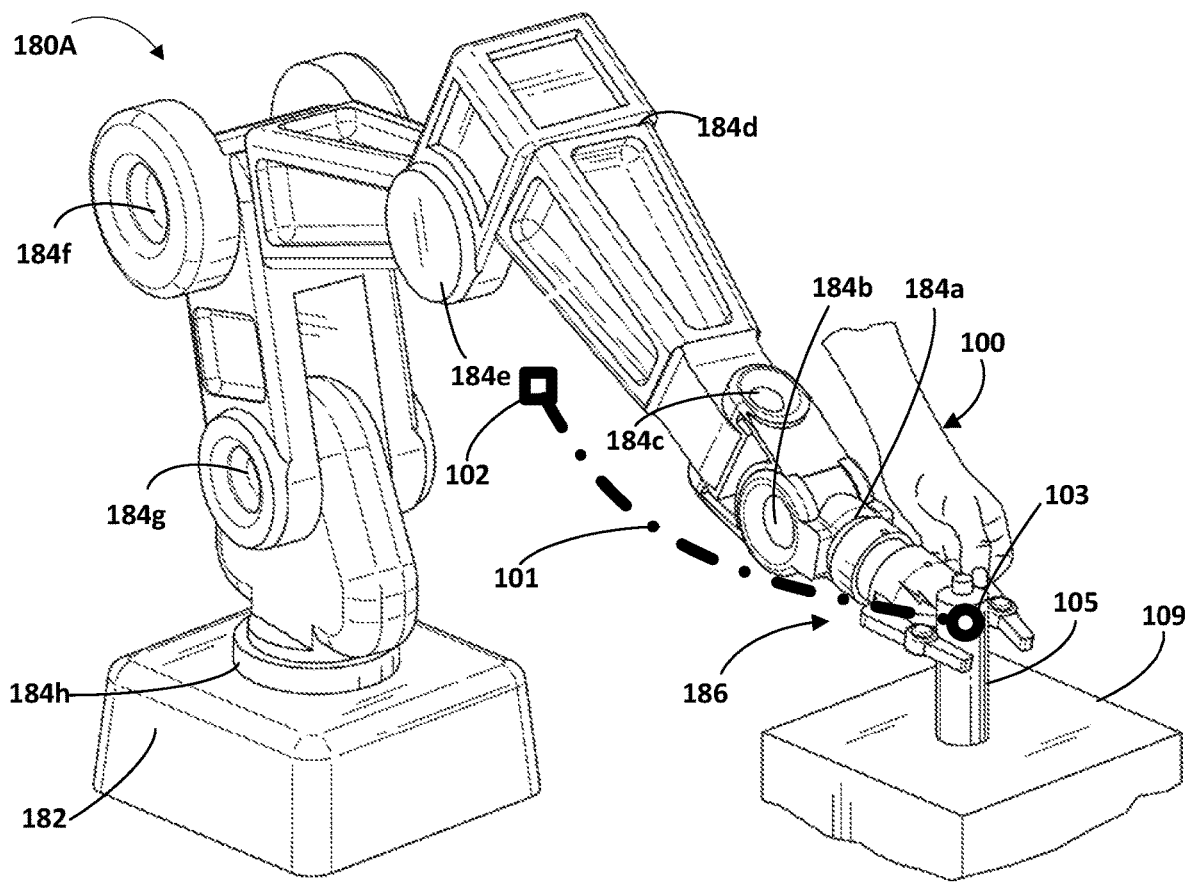
FIG. 2 illustrates an example of a robot that may be utilized in FIG. 1, an example object, and illustrates a user physically manipulating the robot during a kinesthetic teaching.

FIG. 2 illustrates an example of a robot 180A that may be one of the robot(s) 180 utilized in FIG. 1. FIG. 2 also illustrates a user 100 physically grasping an end effector 186 of the robot 180A during physical manipulation of the robot 180A by the user. Also illustrated in FIG. 2 is a spray can 105 resting on a surface 109. As indicated in FIG. 2, the illustrated robot 180A includes a base 182 and eight actuators 184*a-h* that provide degrees of freedom for the robot and provide the robot 180A with kinematic redundancy. It is noted that the actual actuators 184*a-h* are located "under" the exterior shell of the robot 180A, but are labeled with reference to the exterior shell in FIG. 2 for the sake of simplicity. Robot 180A may include other actuators, such as one or more actuators that control opening/closing of actuable members of end effector 186, but those are not labeled in FIG. 2 for the sake of clarity and brevity. Robot 180A may be physically manipulated by the user 100 to cause the robot 180A traverse any one of a plurality of possible trajectories when moving a reference point of end effector 186 from a starting location to a target location. In some implementations, the robot 180A may be in a gravity compensated mode during all or portions of the physical manipulation of the robot 180A by the user.

The trajectory 101 of FIG. 2 illustrates a trajectory followed by a reference point of the end effector 186 during the demonstration (the trajectory is dictated by the physical manipulation of the robot 180A by the user 100). The demonstration started with the reference point at a starting point 102 and ends, as shown in FIG. 2, with the reference point at a target point 103. Sensor data may be generated by the robot 180A during the demonstration, such as sensor data that indicates the pose (i.e., the position and optionally the orientation) of the end effector 186. The sensor data that indicates the pose of the end effector may be, for example, sensor data from one or more position sensors associated with actuators 184*a-h* that control the pose of the end effector. As described herein, the sensor data may be utilized to generate the data points. For example, the data points may be described in joint space (e.g., as the positions of each of the actuators 184*a-h*) and/or task space (e.g., as the position and orientation of the end effector 186, as derived from the position sensors).

Although not illustrated, robot 180A may also include and/or be in communication with one or more user interface input devices, such as a button or other user interface element located on an exterior surface of the robot 180A, a virtual user interface element provided via a tablet or other computing device in communication with the robot 180A, and/or a microphone included with the robot 180A and/or in communication with the robot. In some of those implementations a user may provide user interface input via the user interface element to, for example: indicate the initiation and/or conclusion of a demonstration.

Although a particular robot 180A is illustrated in FIG. 2, additional and/or alternative robots may be utilized, including robots having other robot arm forms, robots having a humanoid form, robots that move via one or more wheels (e.g., other self-balancing robots), and so forth. Also, although a particular grasping end effector 186 is illustrated in FIG. 2, additional and/or alternative end effectors may be utilized.

Example of Generating a Control Policy

As described herein, implementations of this specification are related to various improvements in generating a control policy that regulates both motion control and robot interaction with the environment and/or that includes a learned non-parametric potential function and/or dissipative field. One example of generating such a control policy is now provided in additional detail.

Note that state variables can be composed of both linear and angular motions. When describing various examples, without loss of generality, a state variable is considered that is defined in Cartesian space with the following structure: $\xi=[\xi_1\ \xi_2\ \xi_3]^T=[x\ y\ z]^T$. Such Cartesian space definition is provided for simplicity. It is understood that various techniques described herein are adaptable to definitions of state variables in other spaces, such as joint space. Moreover, state variables may also encode orientation in addition to position.

Consider a state variable $\xi \in \mathbb{R}^d$ that can be used to unambiguously define the state of a robotic system. The state variable $\xi$, for instance, could represent the robot's generalized joint angles, the position and orientation of the end-effector, or solely position or orientation of the end-effector. A control policy, $\tau_c \in \mathbb{R}^d$, can be defined as the negative gradient of a scalar time-invariant potential function $\Phi(\xi): \mathbb{R}^d \mapsto \mathbb{R}^+$ minus a dissipative field $\Psi(\xi, \dot{\xi}): \mathbb{R}^{d \times d} \mapsto \mathbb{R}^d$:

$$\tau_c = -\nabla\Phi(\xi) - \Psi(\xi, \dot{\xi})$$

As described in more detail below, generating the control policy can include learning the potential function $\Phi(\xi)$ and the dissipative field $\Psi(\xi, \dot{\xi})$ based on one or more demonstrations/groups of data points. When the state variable $\xi$ is defined as the generalized joint angles, $\tau_C$ directly corresponds to the actual torque commands that should be sent by a robot control system to the actuators. For example, in generating torque commands at a given time instant, the robot control system can apply the state variables of the robot at that time instant to the control policy to generate torque commands, and provide those torque commands to its actuators. When $\xi$ is defined in task space (in contrast to joint space), the robot control system can use an operational space formulation to compute the actuators torque command from $\tau_c$.

Assume that N kinesthetic teachings are performed through user manipulation of one or more robots. Further assume N demonstrations/groups of data points that are based on robot sensor output during the kinesthetic teachings, with each group of data points being based on sensor data from a corresponding one of the kinesthetic teachings.

The data points can be represented as $\{\xi^{t,n}, \dot{\xi}^{t,n}, \tau^{t,n}\}_{t \times 0,\ n=1}^{T^n,\ N}$ and their corresponding stiffness property represented as $\{S^{t,n}\}_{t=0,\ n=1}^{T^n,\ N}$, where $S^{t,n} \in \mathbb{R}^{d \times d}$ are positive definite matrices. Without loss of generality, further assume the task of the demonstration(s) is defined in a target frame of reference, i.e., $\xi^{T^n,n}=\xi^*=0$, $\forall n \in 1 \ldots N$. This can be achieved by a translation of the demonstration(s). To avoid presence of several indices, the notation can be simplified by concatenating all the demonstrations for each variable into one single vector. Thus, instead of referring to the data points as $\{(\bullet)^{t,n}\}_{t=0,\ n=1}^{T^n,\ N}$ the notation $\{(\bullet)^i\}_{i=1}^T$ is sometimes used herein where $T=\Sigma_{n=1}^N T^n$ is the total number of data points. The index i can be computed for each (t,n). To avoid addressing the correspondence problem, demonstration trajectories can be shown from the robot's point of view, by the user guiding the robot passively through the task (i.e., kinesthetic teaching).

The stiffness properties of data points can be determined utilizing one or more techniques. For example, the stiffness property of a data point can be based on a direct mapping from sensor data of a pressure sensor of the robot (e.g., mounted on a "wrist" of the robot). For instance, the "harder" a user presses on the pressure sensor during a demonstration at the time of the data point, the greater the stiffness property can be. Also, for example, the stiffness property of a data point can additionally or alternatively be based on an inversely proportional mapping to the spatial variance of the data points of a demonstration near the time of the data point (e.g., greater variance, less stiffness). As yet another example, the stiffness property of a data point can additionally or alternatively be based on a function of other variables, such as a task-dependent variable.

As described herein, in some implementations where data points of a demonstration are uniformly distributed over time, they may be resampled to generate a spatial group of spatially distributed data points. In some of those implementations, the spatial group of spatially distributed data points may be used in generating the control policy in lieu of the data points that are uniformly distributed over time. For example, the spatial group may be used in learning the potential function of the control policy.

An energy element $\phi^i: \mathbb{R}^d \mapsto \mathbb{R}^+$ can be associated to each of the demonstration data points $\xi^i$:

$$\phi^i(\xi)=\phi_0^i + \tfrac{1}{2}(\xi-\xi^i)^T S^i (\xi-\xi^i) \forall i \in 1 \ldots T$$

where $\phi_0^i \in \mathbb{R}^+$ is a constant scalar, and $(\bullet)^T$ denotes the transpose. For each energy element $\phi^i(\xi)$, the force by which a particle $\xi$ is attracted to the center $\xi^i$ is given by $-S^i(\xi-\xi^i)$. Thus the higher the $S^i$, the more the attraction force is.

A kernel regression method can be utilized to build the total energy (potential) function based on the energy elements $\phi^i(\xi)$. At a query point $\xi \in \mathbb{R}^d$, the contribution of each energy element can be determined using the Gaussian kernel:

$$\omega^i(\xi)=\pi^i e^{-0.5(\xi-\xi^i)^T (\Sigma^i)^{-1} (\xi-\xi^i)}$$

where $\Sigma^i$ is the smoothness matrix in the task frame as described herein (i.e., a smoothness matrix that optionally defines non-uniform smoothness parameters).

As described herein, the prior weight of each data point ($\pi^i$) can be a function of the spatial distances from that data point to additional data points of the groups of data points. In some implementation, the prior weight ($\pi^i$) of each of the data points (i) of T data points may be determined based on the following:

for i=1: T $\delta = 0$ for k=1: T $\delta = \delta + e^{-0.5(\xi^i - \xi^k)^T (\Sigma^k)^{-1} (\xi^i - \xi^k)}$ $\pi^i = 1/\delta$ The total potential energy at $\xi$ is given by:

$$\Phi(\xi) = \frac{\sum_{i=1}^{T} \omega^i(\xi) \phi^i(\xi)}{\sum_{i=1}^{T} \omega^j(\xi)}$$

The immediately preceding notation can be simplified by denoting $\Sigma_{i=1}^{T}$ with $\Sigma_i$ and defining the normalized weights $\tilde{\omega}^i(\xi)$ by:

$$\tilde{\omega}^i(\xi) = \frac{\omega^i(\xi)}{\sum_j \omega^j(\xi)} \forall i \in 1 \ldots T$$

In some implementations where the need to have virtual data points is obviated, the normalized weights may instead be defined by:

if $\|\xi - \xi^*\| \geq \varepsilon_\xi$:

$$\tilde{\omega}^i(\xi) = \frac{\omega^i(\xi)}{\sum_j \omega^j(\xi)} \quad \forall i \in 1 \ldots T$$

else:

$\tilde{\omega}^i(\xi) = 0 \quad \forall i \in 1 \ldots T - 1$ $\tilde{\omega}^T(\xi) = 1$ where $\epsilon_\xi$ is a positive threshold value, such as a value defined by a user.

Regardless of the definition of the normalized weights, either simplification enables the total potential energy at $\xi$ to be simplified (notation-wise) to:

$$\Phi(\xi) = \sum_i \tilde{\omega}^i(\xi) \phi^i(\xi)$$

The nonlinear weights col (f) have the following two properties: $0 < \tilde{\omega}^i(\xi) \leq 1$ and $\Sigma_i \tilde{\omega}^i(\xi) = 1, \forall \xi \in \mathbb{R}^d$. Considering these properties and the fact that $\phi^i(\xi)$ are positive scalars yields the relation $\Phi(\xi) \geq 0, \forall \xi \in \mathbb{R}^d$.

A simple linear dissipative field $\psi i(\dot{\xi}): \mathbb{R}^d \mapsto \mathbb{R}^d$ can also be associated to each data point, which is given by $\psi^i(\dot{\xi}) = D^i \dot{\xi}$ where $D^i \in \mathbb{R}^{d \times d}$ are positive definite matrices. The total dissipative energy can be computed through nonlinear weighted sum of each dissipative element $\psi^i(\dot{\xi})$:

$\Psi^i(\xi, \dot{\xi}) = \Sigma_i \tilde{\omega}^i(\xi) \psi^i(\dot{\xi})$.

The control policy can be obtained by taking the gradient of $\Psi(\xi) = \Sigma_i \omega^i(\xi) \phi^i(\xi)$ and substituting it, as well as $\Psi^i(\xi, \dot{\xi}) = \Sigma_i \omega^i(\xi) \psi^i(\dot{\xi})$, into $\tau_c = -\nabla \Phi(\xi) - \Psi(\xi, \dot{\xi})$ With a few rearrangements, the obtained control policy can be represented as:

$$\tau_c = \sum_i \tilde{\omega}^i(\xi) \big(\phi^i(\xi) - \Phi(\xi)\big) (\Sigma^i)^{-1} (\xi - \xi^i) - \tilde{\omega}^i(\xi) \big(S^i(\xi - \xi^i) + D^i \dot{\xi}\big)$$

It is noted that there are three main terms in the obtained control policy:

$\tau_{nominal}^i = \tilde{\omega}^i(\xi)(\phi^i(\xi) - \Phi(\xi))(\Sigma^i)^{-1}(\xi - \xi^i);$ $\tau_{attract}^i = \tilde{\omega}^i(\xi) S^i(\xi - \xi^i);$ and $\tau_{damp}^i = \tilde{\omega}(\xi) D^i \dot{\xi}$ Using the immediately preceding three main terms, the control policy can be rewritten as:

$$\tau_c = \sum_i \tau_{nominal}^i + \sum_i \tau_{attract}^i + \sum_i \tau_{damp}^i$$

The terms $\tau_{nominal}^i$ are mainly responsible to generate the nominal motion. $\tau_{nominal}$ is a linear function of $\phi_0^i$ which, as described herein, can be learned from the data points by solving a convex constrained optimization problem. Further, $\tau_{nominal}$ linearly depends on the non-uniform stiffness matrices in the global frame ($\Sigma^i$). The terms $\tau_{attract}^i$ are mainly responsible to generate the attraction force towards the nominal motion. In other words, the terms $\tau_{attract}^i$ mostly determine the impedance property (i.e., how much the robot should resist when perturbed along the direction orthogonal to the nominal motion). The terms $\tau_{damp}^j$ act as dissipating elements, pumping the energy out of the system.

With the above overview of the control policy, additional description is now provided of learning the control policy from data points of user demonstrations. The centers $\xi^i$ and their associated stiffness $S^i$ are known and given by the data points of the demonstrations. It now remains to determine the value of $\Sigma^i$, $\phi_0^i$, and $D^i$ such that the target point becomes the attractor of the potential function $\Phi(\xi)$ and the robot follows the same/similar velocity-profile as shown by the demonstrations.

As described herein, in some implementations the potential gradient ($\gamma$) of all data points of a group can be determined as:

$$\gamma = \big((\kappa^K)(\bar{d}^2)/K\delta t \bar{d} - e^{-\bar{d}K\delta t}\big) \forall i \in 1 \ldots T - 1$$

where $\bar{d} = (1/T+1) \Sigma_{i=0}^T d_1^i$.

As the value of $\nabla \Phi(\xi)$ only depends on $\phi_0^i$, the optimization learning parameters $\Theta$ is a vector created from concatenation of all $\phi_0^i$ (i.e., $\Theta = [\phi_0^1 \ldots \phi_0^T]$). An estimate of $\Theta$ can be obtained by solving the following constrained quadratic optimization problem:

$$\min_\Theta J(\Theta) = \frac{1}{T} \sum_{i=1}^{T} \|\nabla \Phi(\xi^i; \Theta) + \gamma^i\|^2$$

subject to $\phi_0^{i+1} \leq \phi_0^i \quad \forall i = 1 \ldots T, i \notin \Omega, i+1 \notin \Omega$ -continued $$0 \leq \phi_0^i \quad \forall i = 1 \ldots T, i \in \Omega$$

$$\nabla \Phi(\xi) = 0 \quad \xi = \xi^*$$

where $\Omega$ is the set of indices that corresponds to the last point of each demonstration trajectory, which by construction is placed at the target point $\xi^*$:

$$\Omega = \{i | \xi^i = \xi^*\}$$

In implementations where the need to have virtual data points is obviated, the condition: $\nabla \phi(\xi)=0$ $\xi=\xi^*$, may be replaced with:

$$\|\nabla \Phi(\xi)\| \leq \epsilon_\phi \xi = \xi^*$$

where $\epsilon_\phi$ is a positive threshold value, such as a value defined by the user.

The optimization problem given above has T parameters with T inequality constraints and d equality constraints. The optimization problem can be transformed into a constrained quadratic optimization problem after a few rearrangements. Accordingly, despite the high-dimensionality of this optimization problem, it can be efficiently solved (e.g., within a few seconds) using a solver such as cvxgen.

Figure 3:
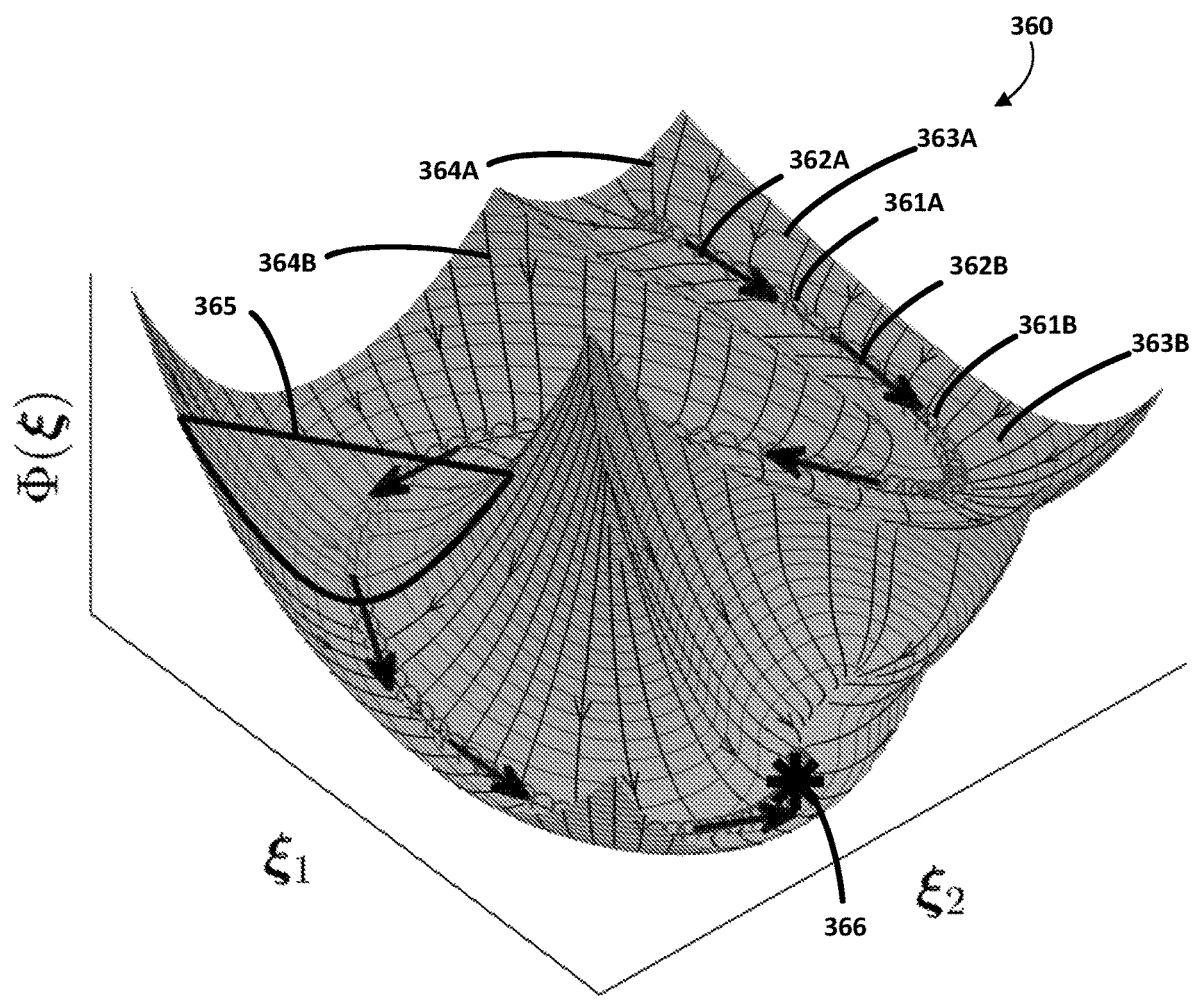
FIG. 3 illustrates a graphical representation of an example of a potential function of a control policy according to various implementations described herein.

FIG. 3 is provided for a graphical representation of an example of a potential function ($\Phi(\xi)$) 360 of a control policy according to various implementations described herein. The potential function 360 captures both motion generation and variable impedance control. The energy levels are shown by "horizontal" lines, two of which are annotated as 363A and 363B. The energy gradients are shown by "vertical" lines, two of which are annotated as 364A and 364B. The potential energy $\phi$ is learned from data points of a demonstration. The data points of the demonstration are illustrated as partial circles (two of which are annotated as 361A and 361B). The potential energy $\phi$ can be generalized as a valley with two significant parameters: a slope and a curvature. The slope captures the motion behavior. If a virtual ball is dropped on any of the demonstration data points, the virtual ball follows the rest of the demonstration with an acceleration governed by the slope and stops at the target point 366 (the local minimum). The solid black arrows in FIG. 3 (two of which are annotated as 362A and 362B) highlight the motion of such an example due to the slope. The curvature is perpendicular to the desired direction of motion and encodes the stiffness behavior. The surface of FIG. 3, outlined by a solid line indicated as 365, visualizes the curvature at a demonstration data point. The higher the curvature the more resistance the virtual ball shows to perturbations, hence returning faster to the nominal motion. Though not illustrated in this figure, the potential function also optionally encodes the damping parameter throughout the state space to avoid oscillation. Note that both slope and curvature are state dependent parameters and could vary throughout the motion.

Example Method

Figure 6:
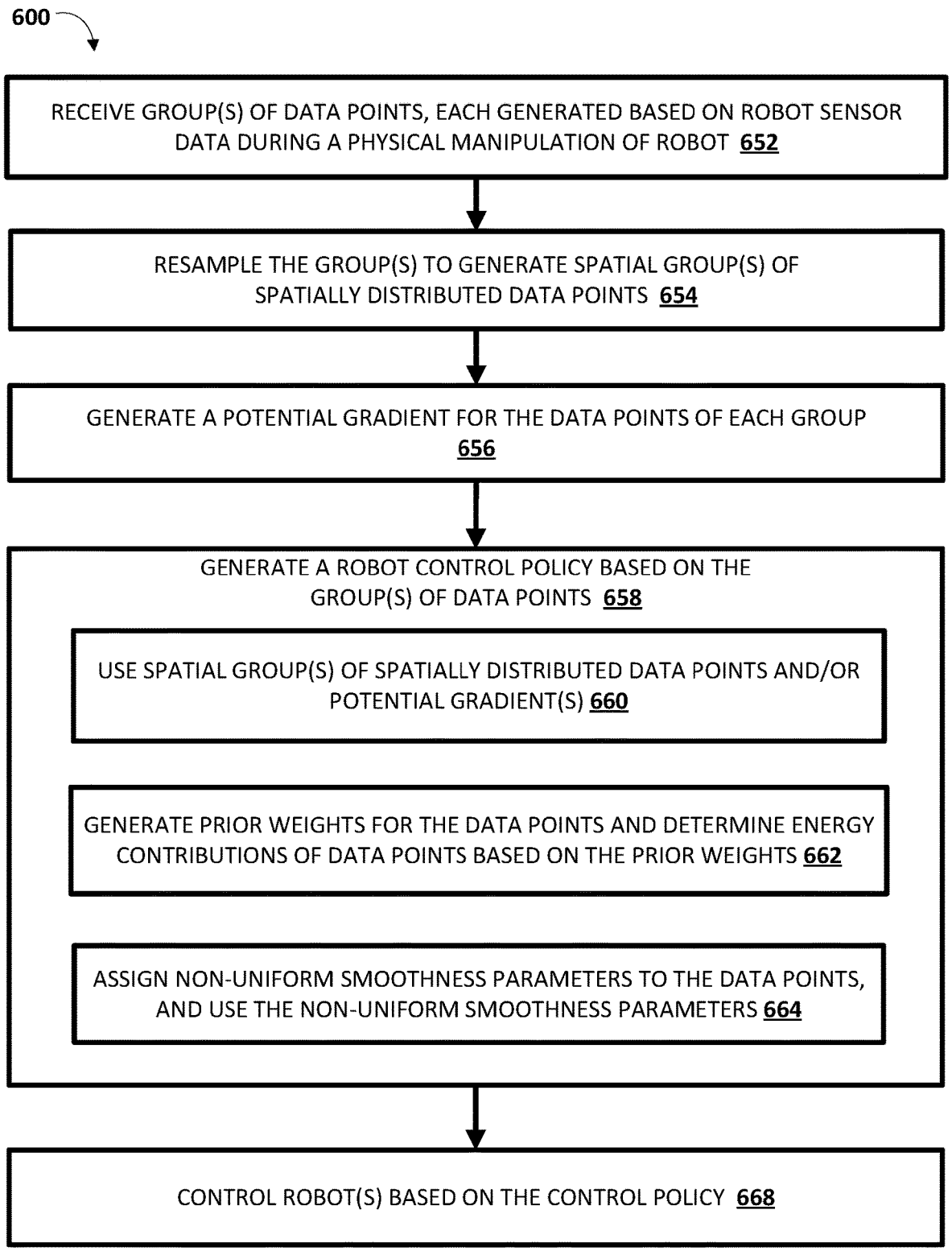
FIG. 6 is a flowchart illustrating an example method according to various implementations disclosed herein.

FIG. 6 is a flowchart illustrating an example method 600 according to various implementations described herein. For convenience, the operations of the flow chart are described with reference to a system that performs the operations. This system may include engines 122 and/or 124 of control policy system 120, which may be implemented by one or more components of a robot, such as a processor and/or robot control system of one or more of the robots 180; and/or may be implemented by one or more computing device(s) that are separate from a robot, such as computing device 810. Moreover, while operations of method 600 are shown in a particular order, this is not meant to be limiting. One or more operations may be reordered, omitted, or added.

At block 652, the system receives one or more groups of data points. Each group of data points is generated based on robot sensor data during a physical manipulation of a corresponding robot. As one example, the system can receive one group of data points that are based on a kinesthetic teaching of a demonstration performed on a corresponding robot. As another example, the system can receive a first group of data points and a second group of data points. The first group can be based on a first kinesthetic teaching performed on a corresponding robot. The second group can be based on a second kinesthetic teaching performed on the same corresponding robot, or on a different corresponding robot.

At block 654, the system resamples each of the one or more groups of block 652 to generate spatial group(s) of spatially distributed data points. For example, a group of data points received at block 652 can be uniformly distributed over time, and the system can resample that group of data points uniformly in space (in contrast to time).

At block 656, the system generates a potential gradient for the data points of each group. For example, the system can generate a potential gradient for the data points of a given group based on a total spatial length, a total time, and/or average damping of the given group.

At block 658, the system generates a robot control policy based on the group(s) of data points. In some implementations, block 658 includes block 660, block 662, and/or block 664.

At block 660, in generating the control policy, the system uses the spatial group(s) of spatially distributed data points generated in block 654 and/or the potential gradient(s) generated in block 656. For example, the system can use the spatial group(s) of spatially distributed data points generated in block 654 in lieu of the temporally distributed group(s) of data points. Also, for example, the system can additionally or alternatively utilize, for the data points of each group, a potential gradient for that group generated in block 658.

At block 662, in generating the control policy, the system generates prior weights for the data points and determines energy contributions for the data points based on the prior weights. In some implementations, block 662 is performed in response to multiple groups of data points being received at block 652. In some implementations, the system generates the prior weight for each data points as a function of the spatial distances from that data point to other data points (e.g., spatial distances from that data point to other data points of all groups/demonstrations).

At block 664, in generating the control policy, the system assigns non-uniform smoothness parameters to the data points, and uses the non-uniform smoothness parameters. In some implementations, the system associates a frame with each data point and, at each data point, defines smoothness with d parameters, where d is the task dimension. In some implementations, at block 664, the system alternatively assigns uniform smoothness parameters to the data points (in lieu of the non-uniform smoothness parameters), and uses the uniform smoothness parameters in generating the control policy.

Although not illustrated, in some implementations, block 658 additionally and/or alternatively includes defining and utilizing a reduced number of stiffness and/or damping parameters for each of the data points and/or generating the control policy without the utilization of virtual data points.

At block 668, the system controls one or more robots based on the control policy. For example, in some implementations the control policy directly corresponds to the actual torque commands that should be sent by a robot control system to the actuators. In those implementations, in generating torque commands at a given time instant, the system can apply the state variables of a robot at that time instant to the control policy to generate torque commands, and provide those torque commands to its actuators. In some other implementations, the system can use an operational space formulation and/or other formulations to determine torque commands and/or other control commands based on the control policy.

Method 600 sets forth an example according to implementations disclosed herein. However, as set forth above, in some implementations one or more operations may be reordered, omitted, or added. As one example, in some implementations block 662 may be omitted. As another example, in some implementations block 656 may be omitted and block 660 may include the system using the spatial group(s) of spatially distributed data points, but omit using automatically determined potential gradient(s) (e.g., manually user set potential gradient(s) may instead be utilized). As yet another example, in some implementations, block 654 may be omitted and block 660 may include using temporal group(s) of temporally distributed data points in lieu of spatial groups of spatially distributed data points.

Example Architecture of a Robot

Figure 7:
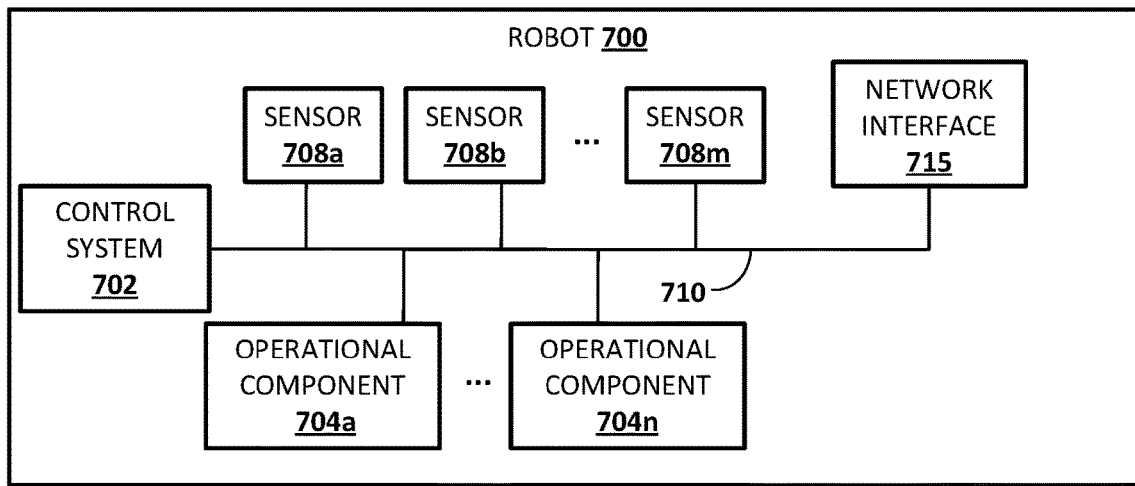
FIG. 7 schematically depicts an example architecture of a robot.

FIG. 7 schematically depicts an example architecture of a robot 700. The robot 700 includes a robot control system 702, one or more operational components 704a-n, and one or more sensors 708a-m. The sensors 708a-m may include, for example, vision sensors (e.g., camera(s), 3D scanners), light sensors, pressure sensors, positional sensors, pressure wave sensors (e.g., microphones), proximity sensors, accelerometers, gyroscopes, thermometers, barometers, and so forth. While sensors 708a-m are depicted as being integral with robot 700, this is not meant to be limiting. In some implementations, sensors 708a-m may be located external to robot 700, e.g., as standalone units.

Operational components 704a-n may include, for example, one or more end effectors (e.g., grasping end effectors) and/or one or more servo motors or other actuators to effectuate movement of one or more components of the robot. For example, the robot 700 may have multiple degrees of freedom and each of the actuators may control actuation of the robot 700 within one or more of the degrees of freedom responsive to control commands provided by the robot control system 702 (e.g., torque and/or other commands generated based on a control policy). As used herein, the term actuator encompasses a mechanical or electrical device that creates motion (e.g., a motor), in addition to any driver(s) that may be associated with the actuator and that translate received control commands into one or more signals for driving the actuator. Accordingly, providing a control command to an actuator may comprise providing the control command to a driver that translates the control command into appropriate signals for driving an electrical or mechanical device to create desired motion.

The robot control system 702 may be implemented in one or more processors, such as a CPU, GPU, and/or other controller(s) of the robot 700. In some implementations, the robot 700 may comprise a "brain box" that may include all or aspects of the control system 702. For example, the brain box may provide real time bursts of data to the operational components 704a-n, with each of the real time bursts comprising a set of one or more control commands that dictate, inter alia, the parameters of motion (if any) for each of one or more of the operational components 704a-n. As described herein, the control commands can be at least selectively generated by the control system 702 based on a control policy generated according to one or more techniques disclosed herein.

Although control system 702 is illustrated in FIG. 7 as an integral part of the robot 700, in some implementations, all or aspects of the control system 702 may be implemented in a component that is separate from, but in communication with, robot 700. For example, all or aspects of control system 702 may be implemented on one or more computing devices that are in wired and/or wireless communication with the robot 700, such as computing device 810.

Example Computing Device

Figure 8:
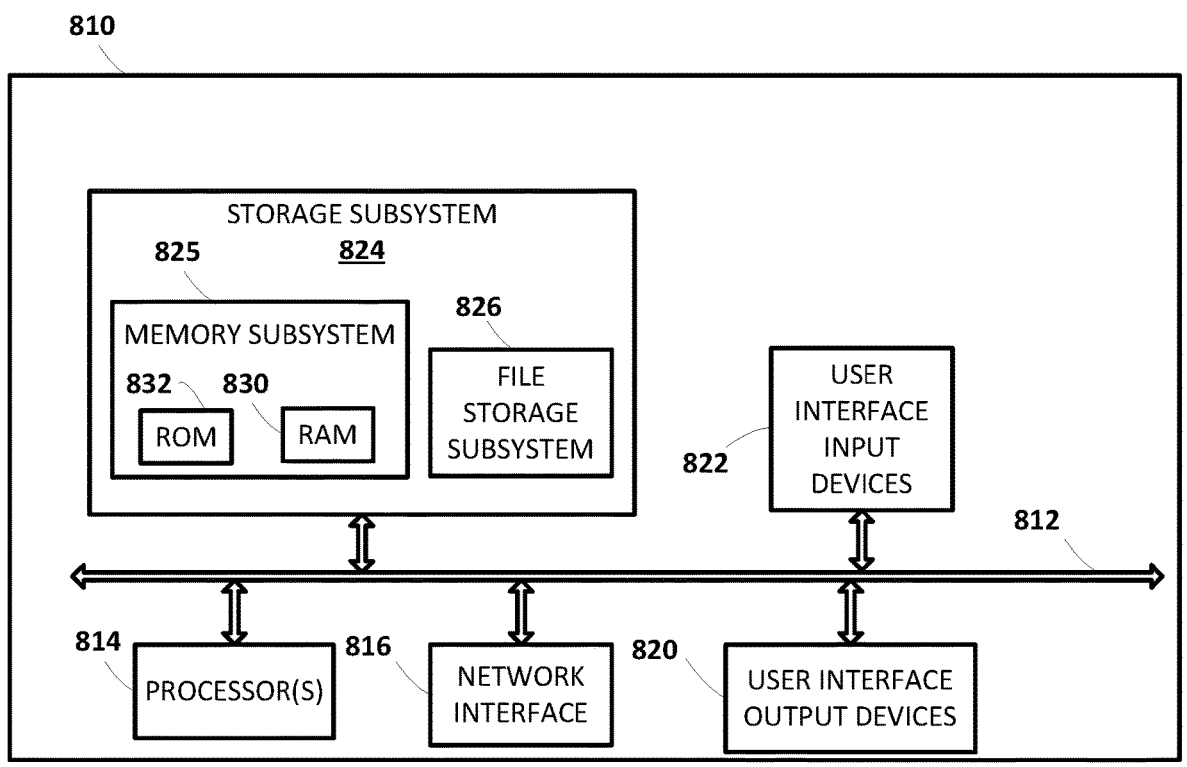
FIG. 8 schematically depicts an example architecture of a computer system.

FIG. 8 is a block diagram of an example computing device 810 that may optionally be utilized to perform one or more aspects of techniques described herein. Computing device 810 typically includes at least one processor 814 which communicates with a number of peripheral devices via bus subsystem 812. These peripheral devices may include a storage subsystem 824, including, for example, a memory subsystem 825 and a file storage subsystem 826, user interface output devices 820, user interface input devices 822, and a network interface subsystem 816. The input and output devices allow user interaction with computing device 810. Network interface subsystem 816 provides an interface to outside networks and is coupled to corresponding interface devices in other computing devices.

User interface input devices 822 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 810 or onto a communication network.

User interface output devices 820 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 810 to the user or to another machine or computing device.

Storage subsystem 824 stores programming and data constructs that provide the functionality of some or all of the modules described herein. For example, the storage subsystem 824 may include the logic to perform selected aspects of the method 600 of FIG. 6.

These software modules are generally executed by processor 814 alone or in combination with other processors. Memory 825 used in the storage subsystem 824 can include a number of memories including a main random access memory (RAM) 830 for storage of instructions and data during program execution and a read only memory (ROM) 832 in which fixed instructions are stored. A file storage subsystem 826 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 826 in the storage subsystem 824, or in other machines accessible by the processor(s) 814.

Bus subsystem 812 provides a mechanism for letting the various components and subsystems of computing device 810 communicate with each other as intended. Although bus subsystem 812 is shown schematically as a single bus, alternative implementations of the bus subsystem may use multiple busses.

Computing device 810 can be of varying types including a workstation, server, computing cluster, blade server, server farm, or any other data processing system or computing device. Due to the ever-changing nature of computers and networks, the description of computing device 810 depicted in FIG. 8 is intended only as a specific example for purposes of illustrating some implementations. Many other configurations of computing device 810 are possible having more or fewer components than the computing device depicted in FIG. 8.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented by one or more processors, comprising:
   receiving a group of data points generated based on sensor data from one or more sensors of a robot during physical manipulation of the robot, the physical manipulation being by a user to traverse a reference point of the robot from an initial point to a target point;
   for each of the data points of the group:
      assigning only d stiffness parameters to the data point, wherein d is a dimension of a task associated with the physical manipulation of the robot,
         wherein the stiffness parameters assigned to each of the data points are based on sensor data, from a pressure sensor of the robot, during the physical manipulation,
         wherein the sensor data is based on force applied to the pressure sensor during the physical manipulation of the robot, and
         wherein the stiffness parameters assigned to a given data point, of the data points, are inversely proportional to spatial variance of the data points near the given data point;
   generating a control policy that regulates both robot motion and robot interaction with an environment, wherein generating the control policy comprises using the data points and the stiffness parameters for the data points in learning a potential function for use in the control policy, the potential function having a global minimum based on the target point; and
   controlling the robot, or an additional robot, based on the control policy.

2. The method of claim 1, further comprising identifying the task based on user input through a user interface input device.

3. The method of claim 1, further comprising identifying the task based on user input through a user interface input device.

4. The method of claim 1, further comprising identifying the task based on the physical manipulation of the robot.

5. The method of claim 1, further comprising identifying the task based on one or more objects detected by camera sensors during the physical manipulation of the robot.

6. A system, comprising:
   a robot;
   one or more computers comprising:
      memory storing instructions;
      one or more processors operable to execute the instructions to:
         receive a group of data points generated based on sensor data from one or more sensors of the robot during physical manipulation of the robot, the physical manipulation being by a user to traverse a reference point of the robot from an initial point to a target point;
         for each of the data points of the group:
            assign only d stiffness parameters to the data point, wherein d is a dimension of a task associated with the physical manipulation of the robot,
               wherein the stiffness parameters assigned to each of the data points are based on sensor data, from a pressure sensor of the robot, during the physical manipulation,
               wherein the sensor data is based on force applied to the pressure sensor during the physical manipulation of the robot, and
               wherein the stiffness parameters assigned to a given data point, of the data points, are inversely proportional to spatial variance of the data points near the given data point;
         generate a control policy that regulates both robot motion and robot interaction with an environment, wherein generating the control policy comprises using the data points and the stiffness parameters for the data points in learning a potential function for use in the control policy, the potential function having a global minimum based on the target point; and
         control the robot based on the control policy.

7. The system of claim 6, wherein one or more of the processors are further operable to execute the instructions to identify the task based on user input through a user interface input device.

8. The system of claim 6, wherein one or more of the processors are further operable to execute the instructions to identify the task based on user input through a user interface input device.

9. The system of claim 6, wherein one or more of the processors are further operable to execute the instructions to identify the task based on the physical manipulation of the robot.

10. The system of claim 6, wherein one or more of the processors are further operable to execute the instructions to identify the task based on one or more objects detected by camera sensors during the physical manipulation of the robot.

* * * * *